United States Patent [19]

Richter et al.

[11] Patent Number: 4,986,232
[45] Date of Patent: Jan. 22, 1991

[54] ARRANGEMENT FOR RECOGNIZING MISFIRINGS IN INTERNAL COMBUSTION ENGINES WITH EXTERNALLY CONTROLLED IGNITION

[75] Inventors: Axel Richter, Wimsheim; Patric Lardy, Weil der Stadt; Ulrich Schempp, Tiefenbronn; Herbert Glueck, Friolzheim, all of Fed. Rep. of Germany

[73] Assignee: Dr. Ing. h.c.F. Porsche AG, Fed. Rep. of Germany

[21] Appl. No.: 563,847

[22] Filed: Aug. 7, 1990

Related U.S. Application Data

[63] Continuation of Ser. No. 379,968, Jul. 14, 1989, abandoned.

[30] Foreign Application Priority Data

Sep. 15, 1988 [DE] Fed. Rep. of Germany ... 8811670[U]

[51] Int. Cl.⁵ .............................................. F02D 7/00
[52] U.S. Cl. .................................... 123/481; 374/113; 374/144

[58] Field of Search ..................... 123/481, 198 F, 425; 73/35

[56] References Cited

U.S. PATENT DOCUMENTS 3,939,711  2/1976  Hanaoka ............................... 73/346
4,550,704  11/1985  Barbo et al. ........................ 123/481

Primary Examiner—Raymond A. Nelli
Attorney, Agent, or Firm—Evenson, Wands, Edwards, Lenahan & McKeown

[57] ABSTRACT

An arrangement for the recognition of misfirings of internal combustion engines with externally supplied ignition in which for the recognition of misfirings, the cylinders are combined into two groups and an ignition system of its own is coordinated to each group; a thermo-element is thereby arranged in the exhaust tract of a cylinder of each group. A pair of thermo-elements is series-connected in opposite polarity and the resulting thermo-voltage at the free ends is monitored by means of two threshold circuits. From the amount and sign of the resulting thermo-voltage, a defective ignition system can be determined and the corresponding cylinder group can be turned off.

22 Claims, 2 Drawing Sheets

ARRANGEMENT FOR RECOGNIZING MISFIRINGS IN INTERNAL COMBUSTION ENGINES WITH EXTERNALLY CONTROLLED IGNITION

This is a continuation of application Ser. No. 07/379,968, filed July 14, 1989, now abandoned.

BACKGROUND AND SUMMARY OF THE INVENTION

The present invention relates to an arrangement for the recognition of misfirings of a multi-cylinder internal combustion engine with externally controlled ignition, having a pair of thermo-elements connected with each other in opposite polarity, whereby one thermo-element each is arranged in an exhaust tract of two cylinders of the internal combustion engine and a threshold circuit detecting the resulting thermo-voltage at the free ends of the thermo-element pair produces a warning signal upon occurrence of a certain value of the thermo-voltage and/or interrupts a supply of operating fuel to the cylinders.

Especially with internal combustion engines having higher numbers of cylinders, it is frequently difficult to determine a misfiring of individual cylinders because these internal combustion engines then still exhibit a relatively great quietness (smooth running). However, this leads to a high exhaust of uncombusted fuel-air mixture, which burdens the environment or which may ignite explosion-like in the exhaust tract. In vehicles which are equipped with a catalyst, such uncombusted mixtures lead either to destructions of the catalyst carrier or to an overheating of the catalyst.

The U.S. Pat. No. 3,939,711 makes use of the fact that in case of failure of the ignition of a cylinder, the temperature of the gas mixture exhausted by the same drops. A thermo-element is therefore arranged in the exhaust tract of each cylinder of the internal combustion engine and all thermo-elements are connected in series coupled in opposite polarity. With an intact ignition, the thermo-voltages of all thermo-elements are equal so that with an even number of thermo-elements, they cancel one another. If an uneven number of cylinders fails or becomes inoperative, then a resulting voltage occurs at the free ends of the thermo-elements which rectified is utilized for the detection of the misfiring. However, it cannot be determined thereby which cylinders have misfired, i.e., only a global defection indication is possible thereby.

It is therefore the object of the present invention to provide a simple arrangement for the recognition of misfirings of multi-cylinder internal combustion engines which enables with simple means a selective recognition of misfirings of cylinders.

The underlying problems are solved according to the present invention in that the cylinders of the internal combustion engine are combined into groups having separate ignition circuits in a known manner and one thermo-element of the thermo-element pair is arranged in the exhaust tract of a respective cylinder of each group.

The advantages of the present invention reside in the first instance in that an arrangement is created which enables with simple means a selective recognition of cylinder misfirings. This permits, without damaging the exhaust system or the catalyst installation, to turn off the defective cylinders; an emergency operation of the internal combustion engine is therefore assured. Additionally, the defect diagnosis and the repair of the internal combustion engine is facilitated.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
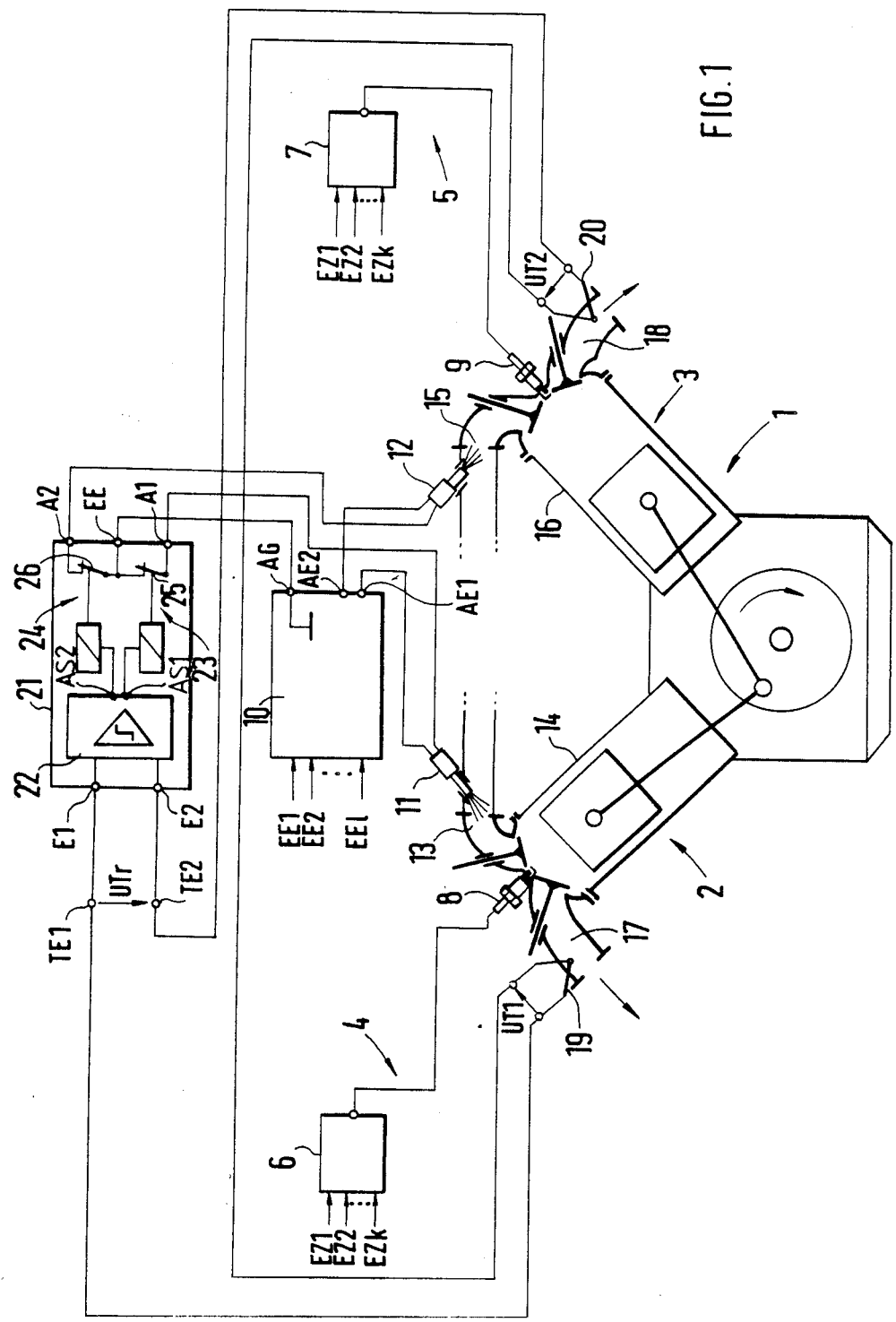
FIG. 1 is a block diagram of an internal combustion engine with an arrangement according to the present invention for the recognition of misfirings.

Referring now to the drawing wherein like reference numerals are used throughout the two views to designate like parts, a multi-cylinder internal combustion engine of known type of construction which is generally designated in FIG. 1 by reference numeral 1, includes a first group 2 and a second group 3 of cylinders (cylinder rows), in this case, for example, in V-arrangement. However, the type of construction is not limited to the V-arrangement; of course, the present invention may also be used in connection with every auto-ignited internal combustion engine having an even number of cylinders $>$ or $=2$.

Both cylinder rows 2 and 3 are provided with separate conventional first and second ignition systems generally designated by reference numerals 4 and 5 which are illustrated symbolically by a first, respectively, second control apparatus 6 and 7 and by first and second spark plugs 8 and 9 of one cylinder row each which are controlled either indirectly (for example, by way of an ignition distributor) or directly by the control apparatus 6 or 7. The control takes place thereby in dependence on operating conditions $EZ1, EZ2, ..., EZk$ of the internal combustion engine 1.

A third control apparatus 10 controlling the supply of fuel to the cylinders takes care of the activation of the injection valves (first injection valve 11, output AE1; second injection valve 12, output AE2) in dependence on operating conditions $EE1, EE2, ..., EE1$. The first injection valves 11 thereby inject fuel into first inlet tracts 13 to the cylinders 14 of the first cylinder row 2 whereas the second injection valves 12 control the fuel supply to the second inlet tracts 15 of the second cylinders 16 of the second cylinder row 3.

As uncombusted fuel-air mixture now reaches the first exhaust tract 17, respectively, second exhaust tract 18 in case of failure of one of the two ignition systems 4, respectively, 5 and can damage thereat exhaust systems, respectively, exhaust gas purification systems, the ignition processes in the cylinders 14, respectively, 16 are to be monitored. This can take place, for example, by monitoring the temperature of the exhaust gas streams. For that purpose, a first thermo-element 19 is arranged in the first exhaust tract 17 which is series-connected in opposite polarity with a second thermo-element 20 installed into the second exhaust tract 18. Owing to this type of circuit connection, a resulting voltage $UTr = UT1 - UT2$ results with temperature equality in both exhaust tracts 17 and 18 (both cylinder rows 2 and 3 are not in operation or both are operating correctly) at the free ends of the thermo-element pair TE1, TE2, which is approximately equal to zero because the thermo-voltages UT1 and UT2, which will occur at the thermo-elements 19 and 20, practically cancel each other.

However, if the temperatures of the exhaust gas streams are strongly different, for example, because one ignition circuit 4 or 5 has failed or has become inoperable, then by reason of the different thermo-voltages UT1 and UT2 a resulting thermo-voltage UTr will be produced which, depending on whether the ignition failure is in the first cylinder row 2 or in the second cylinder row 3, is negative or positive.

A fourth control apparatus 21 now detects this resulting thermo-voltage UTr in that the free ends TE1 and TE2 of the thermo-element pair 19 and 20 are connected to the inputs E1 and E2. The fourth control apparatus 21 includes a threshold circuit 22 which when dropping below a negative value of a first threshold value $-US1$ of the resulting thermo-voltage USr produces at one output AS1 a first signal for the activation of a first relay 23 and when exceeding a positive value of the first threshold voltage $+US1$ produces at an output AS2 a second signal for the activation of a second relay 24.

The first relay 23 thereby actuates a normally closed contact 25 in a common current return line from the first injection valves 11 to the third control apparatus 10 (output AG) so that with activated first relay 23 the operating circuit of the first injection valves 11 between the terminals EE and A1 of the fourth control apparatus 21 and thus the fuel supply to the first cylinder row 2 is interrupted. Equivalent thereto, for turning-off the second cylinder row 3, the second relay 24 actuates a normally closed contact 26 in the common current return line from the second injection valves 12 to the output AG of the third control apparatus 10 so that the operating current circuit of the injection valves 12 between the terminals EE and A2 of the fourth control apparatus 21 is interrupted.

Figure 2:
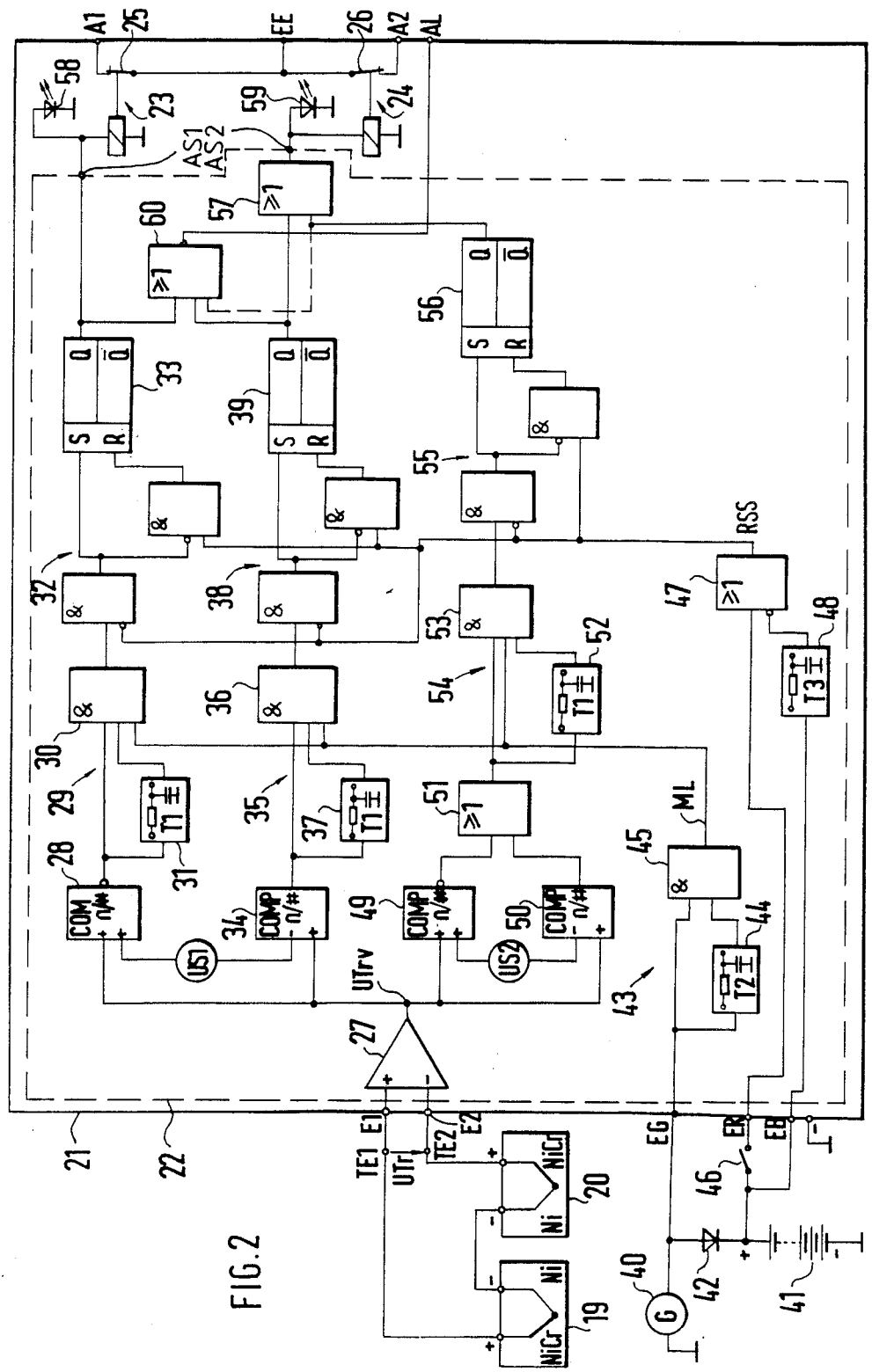
FIG. 2 is an electrical circuit diagram of a control apparatus for the arrangement of FIG. 1.

FIG. 2 finally illustrates the internal (and external) circuitry of the fourth control apparatus 21 with the threshold circuit 22 and with the thermo-element pair connected thereto having the NiCr-Ni thermo-elements 19 and 20 series-connected in opposite polarity, and with the two relays 23 and 24 for the interruption of the current circuits of the injection valves 11 and 12.

An operational amplifier 27 amplifies the resulting thermo-voltage UTr (amplified resulting voltage UTrv) which is compared by a following threshold circuit 28 with a first threshold value US1. If UTrv is smaller than the negative value of US1, then the threshold circuit 28 produces a first high level signal. This passes through a first timing circuit generally designated by reference numeral 29 which is formed by an AND-element 30 and a delay circuit 31. The AND-element 30 thus transmits the first high level signal only when the same exists for at least a first time interval T1 characteristic for the timing circuit and the internal combustion engine 1 runs for at least a second time interval T2 (engine running signal ML).

An exclusive OR-circuit 32 connected in the output of the AND-circuit switches the first high level signal to a setting input S of an RS flip-flop 33 (memory element) in case a reset signal RSS is not present; this effects a high level at the output Q of the flip-flop 33, by means of which the first relay 23 is activated for turning off the first cylinder row 2 (first signal at the output AS1).

Equivalent thereto, the activation of the second relay 24 (second signal at the output AS2) for turning off the second cylinder row 3 takes place by way of a second threshold circuit 34, a second timing circuit 35 consisting of an AND-element 36 and of a delay circuit 37, an exclusive OR-circuit 38 and an RS flip-flop 39 insofar as the amplified resulting thermo-voltage UTrv exceeds the first threshold value US1 for at least the characteristic first time interval T1 with (at least over the second characteristic time interval T2) running internal combustion engine (engine signal ML) and with an absence of the reset signal RSS.

The running of the internal combustion engine is monitored by means of a generator voltage (input EG) which is produced by a generator 40 driven by the internal combustion engine 1 for charging a battery 41 by way of a rectifier 42. A following third timing circuit generally designated by reference numeral 43 (third delay circuit 44, AND-element 45) monitors the presence of the generator voltage and produces the engine running signal ML insofar as the generator voltage is present for at least the characteristic second time interval T2.

The reset signal RSS is produced by a connection of the fourth control apparatus 21 to the battery 41 (input EB) or after actuation of a reset switch 46 (input ER) by way of an OR-element 47, whereby the battery voltage (input EB) is connected by way of a fourth delay circuit 48 delayed by a third characteristic time interval T3 to a negating input of the OR-element 47.

Finally, a third and a fourth threshold circuit 49 and 50 are provided for a self-monitoring function which compare the value of the amplified resulting thermo-voltage UTrv with a higher second threshold value US2 and upon exceeding the second threshold magnitude US2 produce a third high level signal at the output of a following OR-element 51. This third high level signal is switched to an exclusive OR-element 55 having a following third RS flip-flop 56 (set input S)—insofar as this third high level signal is present longer than the first characteristic time interval—by way of a fourth timing circuit 54 consisting of a fourth delay circuit and of an AND-element 53 with the engine running signal present, insofar as a reset signal RSS is not present at the same time at the exclusive OR-element 55.

A set third flip-flop 56 activates the second relay 24, for which purpose the Q output of the third flip-flop 56 and of the second flip-flop 39 are connected by way of an OR-element 57 to the control current circuit of the second relay 24 (turning off of the second cylinder row 3).

First and second light diodes 58 and 59 which are characterized by different color and are connected to the first flip-flop 33 and the OR-element 57 serve for indicating the defective ignition circuit.

Finally, in case of presence of at least one set condition of the first, second or third flip-flop 33, 39, and 56, a ground signal is applied by way of a NOR-element 60 to an output AL connected with the third control apparatus 10 (not shown), on the basis of which a lambda regulation of a motor vehicle equipped therewith is turned off.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An arrangement for recognizing misfirings of a multi-cylinder internal combustion engine with externally supplied ignition, the cylinders of the internal combustion engine being combined into groups of cylinders having separate ignition circuit means, comprising:
   a pair of thermo-elements operatively connected with each other in opposite polarity, one thermo-element each of the theremo-element pair being arranged in the exhaust tract of a cylinder of each group of cylinders, the thermo-element pair having free ends, with a thermo-voltage being produced at the free ends; and
   threshold circuit means for detecting the thermo-voltage and interrupting a supply of fuel to a particular group of cylinders in response to a specified detected thermo-voltage that indicates the ignition circuit means of that particular group of cylinders is defective.

2. An arrangement according to claim 1, wherein the threshold circuit means detects the resulting thermo-voltage according to magnitude and sign and corresponding to the sign produces different first signals and second signals rendering noticeable the inoperable ignition circuit means.

3. An arrangement according to claim 1, wherein the threshold circuit means produces signals only when a resulting thermo-voltage characteristic for the misfiring exists at the threshold circuit means for at least a predetermined first time interval.

4. An arrangement according to claim 3, wherein the threshold circuit means is de-activated for at least a second time interval after the starting and running of the internal combustion engine.

5. An arrangement according to claim 1, wherein the threshold circuit means in case of failure of an ignition circuit means produces a third signal, on the basis of which a lambda regulation of a control apparatus controlling the supply of fuel is turned off.

6. An arrangement according to claim 5, wherein the threshold circuit means includes a self-monitoring function means, by means of which a damage at the thermo-elements or the electrical connections thereof to the threshold circuit means is recognized and the supply of fuel to a predetermined group of cylinders is turned off.

7. An arrangement according to claim 6, wherein the threshold circuit means produces signals only when a resulting thermo-voltage characteristic for the misfiring exists at the threshold circuit means for at least a predetermined first time interval.

8. An arrangement according to claim 7, wherein the threshold circuit means is de-activated of at least a second time interval after the starting and running of the internal combustion engine.

9. An arrangement according to claim 1, wherein the threshold circuit means includes at least two threshold switching means operatively connected at their input in parallel with the free ends of the thermo-element pair, respectively, to an operational amplifier amplifying the resulting thermo-voltage existing thereat, a first one of the threshold switching means being operable to compare the resulting thermo-voltage existing at the free ends of the thermo-element pair, respectively, the resulting thermo-voltage amplified by the operational amplifier with a positive magnitude of a first threshold value and the second threshold switching means being operable to compare the resulting thermo-voltage, respectively, the resulting thermo-voltage amplified by the operational amplifier with a negative magnitude of the first threshold value, the first threshold switching means producing a first high level signal when the resulting thermo-voltage, respectively, the amplified resulting thermo-voltage is negative and greater in absolute value than the first threshold value, and the second threshold switching means producing a second high-level signal when the resulting thermo-voltage, respectively, the amplified resulting thermo-voltage is positive and larger in absolute value than the first threshold voltage.

10. An arrangement according to claim 9, wherein the first high level signal and the second high level signal are transmitted by a first and second timing circuit means connected in the output of the respective threshold switching means only when the first, respectively, second high level signal exists for at least the first time interval.

11. An arrangement according to claim 10, wherein a third and a fourth threshold switching means are provided at the free ends of the thermo-element pair, respectively, the operational amplifier which compare the amount of the resulting thermo-voltage, respectively, of the amplified resulting thermo-voltage with a second threshold value and produce a third high-level signal when the amount of the resulting thermo-voltage, respectively, of the amplified resulting thermo-voltage exceeds the second threshold value.

12. An arrangement according to claim 11, wherein the first high level signal, respectively, the signal transmitted by the first timing circuit means sets a first memory element activating a first relay interrupting a current circuit of injection valves of the first group of cylinders and the second high level signal, respectively, the signal transmitted by the second timing circuit means sets a second memory element activating a second relay interrupting a current circuit of injection valves of the second group of cylinders.

13. An arrangement according to claim 12, wherein a fourth timing circuit means transmitting the third high level signal after the presence over the first time interval sets a third memory element activating the second relay.

14. An arrangement according to claim 13, wherein the threshold circuit means includes a third timing circuit means which monitors the running condition of the internal combustion engine and suppresses a response of the threshold circuit means for at least the second time interval by logic circuit means.

15. An arrangement according to claim 1, wherein the threshold circuit means includes at least two threshold switching means operatively connected at their input in parallel with the free ends of the thermo-element pair, respectively, to an operational amplifier amplifying the resulting thermo-voltage existing thereat, a first one of the threshold switching means being operable to compare the resulting thermo-voltage existing at the free ends of the thermo-element pair, respectively, the resulting thermo-voltage amplified by the operational amplifier with a positive magnitude of a first threshold value and the second threshold switching means being operable to compare the resulting thermo-voltage, respectively, the resulting thermo-voltage amplified by the operational amplifier with a negative magnitude of the first threshold value, the first threshold switching means producing a first high level signal when the resulting thermo-voltage, respectively, the amplified resulting thermo-voltage is negative and greater in absolute value than the first threshold value, and the second threshold switching means producing a second high-level signal when the resulting thermo-voltage, respectively, the amplified resulting thermo-voltage is positive and larger in absolute value than the first threshold voltage.

16. An arrangement according to claim 15, wherein the first high level signal and the second high level signal are transmitted by a first and second timing circuit means connected in the output of the respective threshold switching means only when the first, respectively, second high level signal exists for at least a first time interval.

17. An arrangement according to claim 15, wherein a third and a fourth threshold switching means are provided at the free ends of the thermo-element pair, respectively, the operational amplifier which compare the amount of the resulting thermo-voltage, respectively, of the amplified resulting thermo-voltage with a second threshold value and produce a third high-level signal when the amount of the resulting thermo-voltage, respectively, of the amplified resulting thermo-voltage exceeds the second threshold value.

18. An arrangement according to claim 16, wherein the first high level signal, respectively, the signal transmitted by the first timing circuit means sets a first memory element activating a first relay interrupting a current circuit of injection valves of the first group of cylinders and the second high level signal, respectively, the signal transmitted by the second timing circuit means sets a second memory element activating a second relay interrupting a current circuit of injection valves of the second group of cylinders.

19. An arrangement according to claim 15, wherein a fourth timing circuit means transmitting the third high level signal after the presence over the first time interval sets a third memory element activating the second relay.

20. An arrangement according to claim 16, wherein the threshold circuit means includes a third timing circuit means which monitors the running condition of the internal combustion engine and suppresses a response of the threshold circuit means for at least the second time interval by logic circuit means.

21. In the arrangement according to claim 5, wherein the threshold circuit means includes a self-monitoring function means, by means of which a damage at the thermo-elements or the electrical connections thereof to the threshold circuit means is recognized and a warning signal is produced.

22. In the arrangement according to claim 21, wherein the threshold circuit means includes a self-monitoring function means, by means of which a damage at the thermo-elements or the electrical connections thereof to the threshold circuit means is recognized and the lambda regulation is turned off.

* * * * *

UNITED STATES PATENT AND TRADEMARK OFFICE
CERTIFICATE OF CORRECTION

PATENT NO. : 4,986,232

DATED : January 22, 1991

INVENTOR(S) : Axel Richter, Patric Lardy, Ulrich Schempp, Herbert Glueck

It is certified that error appears in the above-identified patent and that said Letters Patent is hereby corrected as shown below: Title page:

Item (56);

Please add to the references cited, the references listed below:

| | | | |
|---|---|---|---|
| 1,489,644 | 4/1924 | Luscombe | |
| 1,669,510 | 5/1928 | Fearn | |
| 2,117,027 | 5/1938 | Langbein | 73/341 |
| 2,274,068 | 2/1942 | Johnson | 219/32 |
| 2,398,606 | 4/1946 | Wang | 171/95 |
| 2,473,627 | 6/1949 | Wickizer, et al. | 136/04 |
| 2,616,296 | 11/1952 | Wannamaker, Jr. | 73/341 |
| 2,660,883 | 12/1953 | Wyczalek | 73/35 |
| 3,109,617 | 11/1963 | Meyer | 248/186 |
| 3,472,068 | 10/1969 | List, et al. | 73/116 |
| 3,738,108 | 6/1973 | Goto, et al. | 60/277 |
| 3,983,754 | 10/1976 | Deguchi, et al. | 73/346 |
| 3,999,383 | 12/1976 | Hanaoka | 60/277 |

Signed and Sealed this

Twenty-ninth Day of September, 1992

Attest:

DOUGLAS B. COMER

Attesting Officer

Acting Commissioner of Patents and Trademarks